United States Patent Office — 3,402,995 — Patented Sept. 24, 1968

3,402,995
METHOD OF PREPARING ALKALI METAL IODIDES

Ricardo O. Bach, Gastonia, N.C., assignor to Lithium Corporation of America, New York, N.Y., a corporation of Delaware
No Drawing. Filed Dec. 22, 1965, Ser. No. 515,748
10 Claims. (Cl. 23—89)

ABSTRACT OF THE DISCLOSURE

A method of preparing alkali metal iodides which comprises forming a reaction mixture of elemental iodine and an alkali metal hydroxide in substantially stoichiometric proportions, and reacting the iodine with the hydroxide in the presence of hydrogen sulfide while agitating the reaction mixture. The resulting reaction mixture comprises an essentially pure aqueous solution of the desired alkali metal iodide and an elemental sulfur precipitate which can readily and easily be separated.

---

A number of methods heretofore have been proposed for preparing alkali metal iodides. While certain of these methods have been used commercially to prepare such iodides, they have, generally speaking, one or more significant disadvantages, notably from the standpoint of the number of steps required to obtain the iodide, the number and types of chemical agents utilized, and the low yield and low purity of the end product.

In accordance with the present invention there is provided a method of preparing alkali metal iodides which overcomes various of the aforementioned disadvantages of prior art methods. The method of this invention essentially is carried out in a single step and employs inexpensive, easy-to-handle materials. The iodides are obtained either in aqueous solution at a relatively high concentration, or in a high-purity hydrated or anhydrous form.

Briefly stated, the method of the present invention involves forming a reaction mixture of elemental iodine, particularly in powdered or finely divided form, and an alkali metal hydroxide, in an aqueous medium, and reacting the iodine with the hydroxide in the presence of hydrogen sulfide. The reaction mixture most advantageously is in the form of an aqueous slurry and is vigorously agitated throughout the reaction. Sulfur precipitates out during the reaction and can be removed by filtration from the reaction mixture, either before or after neutralization of the mixture following completion of the reaction. The filtered solution, which contains a relatively high concentration of the iodide, can be placed in suitable containers and marketed in this form, or it can be evaporated to provide a highly pure hydrate of the iodide, or dried to provide an anhydrous iodide of better than 99% purity. Yields are excellent, being of the order of 80% to 90% of theoretical.

The alkali metal hydroxide (which term, in the case of lithium hydroxide, for example, includes lithium hydroxide hydrates such as lithium hydroxide monohydrate) and the iodine advantageously are utilized in solid form in forming the reaction mixture. Generally speaking, the hydroxide and the iodine are introduced separately into a suitable reaction vessel containing a sufficient quantity of water to form a slurry having a consistency permitting of vigorous agitation with standard equipment.

The proportions of alkali metal hydroxide and iodine utilized in carrying out the method of the present invention can be varied within reasonable limits. The generally optimum objectives of the invention, however, are most advantageously achieved with approximately stoichiometric or theoretical proportions of the hydroxide and the iodine, namely, an alkali metal hydroxide to iodine molar ratio of about 2:1. Excellent results are obtained where the iodine is in slight excess, for instance, of the order of 5% excess, over the stoichiometric quantity of the alkali metal hydroxide.

The quantity of water employed in forming the reaction mixture may vary considerably. However, since water is produced during the reaction, and, further, with a view toward obtaining iodide solutions of maximum concentration, or, in those instances where the hydrated or anhydrous form of the iodide is desired, with a view toward reducing the amount of liquid to be evaporated, the quantity of water used should be judiciously regulated. To this end, the quantity of water utilized in forming the reaction mixture in accordance with the practice of this invention advantageously should constitute from about 20% to about 40%, especially desirably from about 25% to about 35%, by weight, of the initially formed slurry.

As indicated hereinabove, the objectives of the present invention are attained by carrying out the reaction between the alkali metal hydroxide and elemental iodine in the presence of hydrogen sulfide. The formation of the alkali metal iodide is believed to proceed in accordance with the following equation:

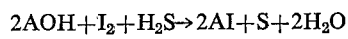

$$2AOH + I_2 + H_2S \rightarrow 2AI + S + 2H_2O$$

wherein A represents an alkali metal. While the hydrogen sulfide may be introduced into the reaction mixture in the form of a gas or a concentrated solution thereof, in order to maintain the liquid content of the finally obtained iodide solution at levels conducive to the attainment of the objectives pointed out hereinabove, the hydrogen sulfide most advantageously is employed as a gas.

The conditions under which the hydrogen sulfide is introduced into the reaction mixture have a material effect not only on the yield of alkali metal iodide obtained, but also on the physical characteristics of the sulfur precipitated during the reaction. Of particular importance in this regard is the necessity for vigorously agitating the reaction mixture during addition of the hydrogen sulfide. Vigorous agitation of the reaction mixture tends to prevent the precipitated sulfur from boiling up and occluding the formation of the alkali metal iodide. In addition, vigorous agitation has the effect of causing the sulfur to preciptate in the form of easy-to-filter flakes. The foregoing considerations are favored by incrementally adding the hydrogen sulfide to the reaction mixture. In following this practice, from about 5% to about 15% of the total quantity of the hydrogen sulfide employed in carrying out the reaction is introduced into the mixture per hour.

The quantity of hydrogen sulfide used in carrying out the method of this invention can be varied within appreciable limits. The generally optimum objectives of the invention, however, are attained with approximately stoichiometric or theoretical amounts of the hydrogen sulfide, with especially desirable results being achieved when the hydrogen sulfide is employed in slight excess, more specifically, of the order of from 5% to 20%, usually from 10% to 15%, over theoretical.

The temperature at which the method of the present invention is carried out is variable. Generally speaking, the temperature of the reaction mixture should be maintained at a level which will avoid adverse thermal effects on the reactants and the formed alkali metal iodide. By way of specific illustration, in the formation of lithium iodide by the reaction of elemental iodine with lithium hydroxide monohydrate in accordance with the practice of this invention, the temperature of the reaction mixture advantageously is maintained within the range of from 25° C. to 60° C., usually 35° C. to 50° C.

The completeness of the reaction may be determined visually, or, and more accurately, by titration with a weak acid solution. In the first instance, when all of the iodine has been reacted with the hydroxide, the reaction mixture will become clear and be free of the characteristic color imparted to it by the elemental iodine. In the latter instance, a 0.25 N HCl solution, for example, may be used in making the determination.

The following are illustrative specific examples of carrying out the present invention:

Example 1

A mixture of 252 grams of lithium hydroxide monohydrate, 762 grams of iodine and 100 grams of water is placed in a ball mill and milled overnight. The resulting wet slurry is placed in a 3 liter beaker and mixed with 2 liters of water. While the mixture is vigorously stirred, hydrogen sulfide is introduced into the mixture for 1 hour and 15 minutes. The resulting solution is filtered after the iodine color has disappeared and the solution is acidic. Approximately 2524 grams of a 33.5% lithium iodide solution is obtained. This solution is evaporated at atmospheric pressure to a temperature of 136° C. The time consumed in the evaporation is 106 minutes. Approximately 1192 grams of 98.8% lithium iodide trihydrate is obtained.

Example 2

A mixture of 504 grams of lithium hydroxide monohydrate, 1524 grams of iodine and 400 grams of water is placed in a ball mill and milled overnight. The resulting slurry is divided into two equal portions. One portion is placed in a 4 liter glass beaker and hydrogen sulfide is fed into it through a sparger for 1½ hours. The resulting solution comprises approximately 28.6% lithium iodide. After filtration from the precipitated sulfur, 27 milliliters of a 2.2 N lithium hydroxide solution is added to bring the pH of the iodide solution to 7.6. The neutralized solution is evaporated down to a weight of approximately 1142 grams (98.8% lithium iodide trihydrate) in 134 minutes. The final temperature reached is 142° C.

The second portion of the mixture is treated in the same manner as the first. The lithium iodide trihydrate obtained is then placed into a vacuum drying oven and dried for 48 hours up to a temperature of 187° C. under a vacuum of 29.2 inches. Approximately 605 grams of anhydrous lithium iodide of 99.8% purity is obtained.

Example 3

Approximately 45 gallons of water is placed in a 100 gallon glass lined reactor equipped with a cooling jacket and agitator. Approximately 800 pounds of iodine is then introduced into the reactor and the mixture agitated. Approximately 270 pounds of lithium hydroxide monohydrate is added to the mixture in the reactor. Hydrogen sulfide is fed into the mixture through a PVC sparger at the rate of approximately 10–12 pounds per hour. The temperature of the reaction mixture is maintained between 35° C. to 50° C. After 90 pounds of hydrogen sulfide is fed into the reaction mixture, a sample of the mixture is removed and titrated with a 0.25 N HCl solution to determine completeness of reaction. Addition of hydrogen sulfide is continued until titration indicates completion of the reaction. Approximately 120 pounds of hydrogen sulfide are used to reach this point. The resulting solution is neutralized, and then filtered through a plate and frame filter press to remove sulfur. The filtrate thereafter is passed through a polishing filter into 30 gallon drums. The final solution is 56% lithium iodide and has a specific gravity of 1.683 grams per cubic centimeter.

Example 4

Approximately 40 gallons of water is placed in a reactor of the type employed in Example 3. Approximately 500 pounds of iodine and 220 pounds of potassium hydroxide is then added. The mixture is treated as in Example 3. A total of 100 pounds of hydrogen sulfide is used. The final solution is 46% potassium iodide.

Example 5

The procedure outlined in Example 3 is followed except that sodium hydroxide is substituted for lithium hydroxide monohydrate. The final solution obtained is 49% sodium iodide.

The invention is especially advantageous for the production of lithium iodide but, as is clear from the foregoing examples, is also desirable for producing the other alkali metal iodides such as sodium iodide and potassium iodide, in addition to cesium iodide and rubidium iodide. The corresponding alkali metal hydroxides in appropriate approximately stoichiometric quantities in relation to the elemental iodine will, of course, as indicated in the examples, be utilized where said alkali metal iodides are desired.

What is claimed is:

1. A method of preparing an alkali metal iodide comprising forming a reaction mixture of elemental iodine and an alkali metal hydroxide in substantially stoichiometric proportions, and reacting the iodine with the hydroxide in the presence of hydrogen sulfide while agitating the reaction mixture, the resulting reaction mixture comprising an essentially pure aqueous solution of the alkali metal iodide and an elemental sulfur precipitate.

2. A method as claimed in claim 1 wherein the hydrogen sulfide is incrementally introduced into the reaction mixture.

3. A method as claimed in claim 1 wherein the total amount of hydrogen sulfide used is in excess of the theoretical amount required to complete the reaction.

4. A method as claimed in claim 1 wherein the reaction mixture is in the form of an aqueous slurry.

5. A method as claimed in claim 1 wherein the alkali metal hydroxide is lithium hydroxide monohydrate.

6. A method as claimed in claim 5 wherein the reaction mixture is maintained at a temperature of from about 25° C. to about 60° C.

7. A method as claimed in claim 5 wherein the lithium iodide is recovered as an aqueous solution having a density of from about 1.6 to 1.7 grams per cubic centimeter.

8. A method as claimed in claim 1 wherein the alkali metal hydroxide is potassium hydroxide.

9. A method as claimed in claim 1 wherein the alkali metal hydroxide is sodium hydroxide.

10. A method as claimed in claim 4 wherein the water used forming the slurry comprises from about 20% to about 40%, by weight of the slurry.

References Cited

UNITED STATES PATENTS

| | | | |
|---|---|---|---|
| 3,219,409 | 11/1965 | Asher | 23—89 |
| 2,828,184 | 3/1958 | Behrman | 23—89 XR |
| 3,132,068 | 5/1964 | Behrman | 23—89 XR |

OTHER REFERENCES

J. W. Mellor's book, "A Comprehensive Treatise on Inorganic and Theoretical Chemistry," vol. 2, 1922 ed., page 596. Longmans, Green & Co., New York.

Jacobsen's book "Encyclopedia of Chemical Reactions," vol. 7, 1958 ed., page 97. Reinhold Publishing Corp., New York.

OSCAR R. VERTIZ, *Primary Examiner.*

EDWARD STERN, *Assistant Examiner.*